(12) United States Patent
Godard et al.

(10) Patent No.: US 11,643,223 B2
(45) Date of Patent: May 9, 2023

(54) FLOOR ASSEMBLY FACILITY FOR TWO FUSELAGE SECTIONS USING A TRANSPORT TROLLEY ASSOCIATED WITH AN ADJUSTABLE SUPPORT

(71) Applicant: Airbus Operations (S.A.S.), Toulouse (FR)

(72) Inventors: Cédric Godard, Toulouse (FR);
Florian Collado, Toulouse (FR);
Jacques Bouriquet, Toulouse (FR);
Jean-Marc Datas, Toulouse (FR);
Nicolas Darbonville, Blagnac (FR);
André Aquila, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/487,617

(22) Filed: Sep. 28, 2021

(65) Prior Publication Data
US 2022/0097870 A1 Mar. 31, 2022

(30) Foreign Application Priority Data

Sep. 30, 2020 (FR) ...................................... 2009991

(51) Int. Cl.
*B64F 5/50* (2017.01)
*B64F 5/10* (2017.01)
*B64C 1/06* (2006.01)

(52) U.S. Cl.
CPC .................. *B64F 5/50* (2017.01); *B64F 5/10* (2017.01); *B64C 1/069* (2013.01)

(58) Field of Classification Search
CPC ............... B64F 5/50; B64F 5/10; B64C 1/069
See application file for complete search history.

(56) References Cited

U.S. PATENT DOCUMENTS 2,712,874 A * 7/1955 Murray .................... B60P 3/11
254/10 R
9,090,357 B2 * 7/2015 Oberoi ..................... B64F 5/50
(Continued)

FOREIGN PATENT DOCUMENTS

| CN | 102001451 A | * | 4/2011 |
| CN | 102001451 B | | 5/2013 |

(Continued)

OTHER PUBLICATIONS

French Search Report for Application No. 2009991 dated Jun. 8, 2021.

*Primary Examiner* — Lawrence Averick
(74) *Attorney, Agent, or Firm* — KDW Firm PLLC

(57) ABSTRACT

A facility for simplifying the facilities and tools required to assemble a first aircraft fuselage section and a second aircraft fuselage section by the ends thereof, these sections being fragile, large elements. The facility includes a logistics trolley that can be moved on the floor and immobilized in a position to carry the first section, at least one adjustable support installed on the floor at another position that is adjustable with six degrees of freedom, to carry the second section. Each support can be commanded to adjust the position of the second section in relation to the first section, such as to position one end of the second section in geometric conformity with one end of the first section. This arrangement enables all movements to be made directly on the floor, obviating the need to provide lifting machines or overhead traveling cranes within the assembly facility.

11 Claims, 10 Drawing Sheets

(56) References Cited

U.S. PATENT DOCUMENTS

| | | | |
|---|---|---|---|
| 10,213,823 B2* | 2/2019 | Oberoi | B29C 39/22 |
| 10,723,485 B2* | 7/2020 | Moore | B25J 11/0075 |
| 10,919,746 B2* | 2/2021 | Stone | B64F 5/10 |
| 11,260,994 B2* | 3/2022 | Guibert | B64C 1/069 |
| 11,267,585 B2* | 3/2022 | Datas | B21J 15/142 |
| 11,312,505 B2* | 4/2022 | Datas | B64F 5/50 |
| 2016/0009422 A1* | 1/2016 | Oberoi | G05D 1/0088 182/141 |
| 2018/0118540 A1* | 5/2018 | Stone | B66F 7/16 |
| 2019/0322388 A1* | 10/2019 | Moore | B05B 13/0431 |
| 2020/0094991 A1* | 3/2020 | Datas | B21J 15/42 |
| 2021/0197984 A1* | 7/2021 | Datas | B64F 5/10 |
| 2021/0237905 A1* | 8/2021 | Godard | B64F 5/10 |

FOREIGN PATENT DOCUMENTS

| | | |
|---|---|---|
| CN | 104229158 B | 5/2016 |
| DE | 102004056284 A1 | 5/2006 |
| EP | 2604523 A2 | 6/2013 |
| EP | 3556664 A1 | 10/2019 |

* cited by examiner

FLOOR ASSEMBLY FACILITY FOR TWO FUSELAGE SECTIONS USING A TRANSPORT TROLLEY ASSOCIATED WITH AN ADJUSTABLE SUPPORT

CROSS-REFERENCE TO RELATED APPLICATION

This application claims the benefit of and priority to French patent application number 2009991 filed on Sep. 30, 2020, the entire disclosure of which is incorporated by reference herein.

TECHNICAL

The disclosure herein relates to the assembly of two aircraft fuselage sections in an installation enabling final assembly operations to form an entire aircraft fuselage.

BACKGROUND

The fuselage of an aircraft has different sections that are often substantially cylindrical and that are made separately before being shipped to an assembly site to be assembled in order to build the entire fuselage.

In practice, the sections are stored in an external storage zone and have to be conveyed into a covered assembly facility in which the sections have to be positioned precisely in relation to one another for assembly.

In the case of a commercial aircraft, the fuselage sections to be assembled are very large, and consequently assembly requires precise handling and positioning of the sections, which are relatively fragile.

In this context, assembly facilities are usually complex, on account of the large sizes requiring lifting machines and/or overhead traveling cranes to be provided in the covered facility to enable the sections intended for assembly to be moved to the related assembly stations.

Installation of such a facility, which involves dimensioning the lifting machines and overhead traveling cranes, takes a long time and is therefore not very flexible. Indeed, conveying a section from the outside storage space to an assembly station requires the section to be moved from an external haulage unit to a lifting machine or the like in the facility, before moving the section to the related assembly station.

The disclosure herein is intended to provide a solution that simplifies the facilities and tools required to assemble several fuselage sections in such a facility.

SUMMARY

For this purpose, the disclosure herein relates to a facility for assembling a first aircraft fuselage section and a second aircraft fuselage section via edges of the ends thereof, including:
  a floor,
  a logistics trolley that is arranged to carry the first section, that can be moved on the floor and immobilized in a predetermined position,
  a transport trolley that is arranged to carry the first section, that can be moved on the floor, and that is arranged to transfer the first section to the logistics trolley,
  at least one adjustable support that is installed on the floor in another predetermined position, to carry the second section,
  a transport trolley that is arranged to carry the second section, that can be moved on the floor, and that is arranged to transfer the section to the adjustable support,
  wherein each adjustable support can be commanded to adjust the position of the second section in relation to the first section, such as to position one edge of one end of the second section in geometric conformity with one edge of one end of the first section.

This arrangement enables all movements to be made directly on the floor, obviating the need to provide lifting machines or overhead traveling cranes within the assembly facility.

The disclosure herein also relates to such a facility, including a transport trolley fitted with a front central cradle and a rear central cradle to support the second section, in which these cradles can be removed from the transport trolley and transferred along with the second section to the adjustable support.

The disclosure herein also relates to such a facility, in which the transport trolley comprises a U-shaped chassis that can be positioned about the adjustable support while holding the second section above the adjustable support.

The disclosure herein also relates to such a facility, in which the adjustable support can adjust the position of the second section with six degrees of freedom.

The disclosure herein also relates to such a facility, in which the adjustable support comprises two hexapods, each of which is arranged to receive a cradle to carry the second section using these cradles.

The disclosure herein also relates to such a facility, in which at least one adjustable support can be moved on the floor when not carrying a second section.

The disclosure herein also relates to such a facility, in which the adjustable support has a U-shaped frame enabling the transport trolley to be positioned inside the frame while holding the second section above the frame.

The disclosure herein also relates to such a facility, in which the adjustable support includes a frame fitted with a front central cradle and a rear central cradle to hold the second section, and wherein each cradle can be raised and lowered in order to adjust the position of the second section, and in which the frame rests on movable plates built into the floor that enable this frame to be repositioned locally on the floor in order to adjust the position of the second section.

The disclosure herein also relates to such a facility, in which the adjustable support has a frame that can be moved on the floor when not carrying a second section.

DETAILED DESCRIPTION

Figure 1:
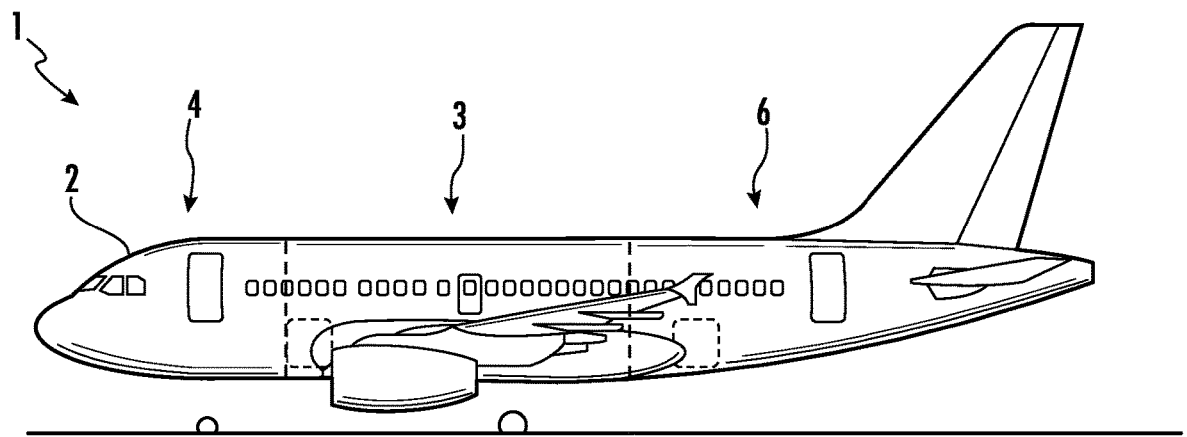
FIG. 1 is a schematic side view of an entire aircraft.

In FIG. 1, an aircraft 1 has a fuselage 2 having an overall cylindrical shape and comprising a central section 3 carrying two wings, this central section being extended by a front section 4 and a rear section 6, the front and rear extending in relation to the direction of forward movement of the aircraft in operation.

In general, the sections of the fuselage are received separately at an assembly site, then conveyed into a covered assembly facility, such as a hangar or the like, having a floor on which the different components are moved.

Central Section

Figure 2:
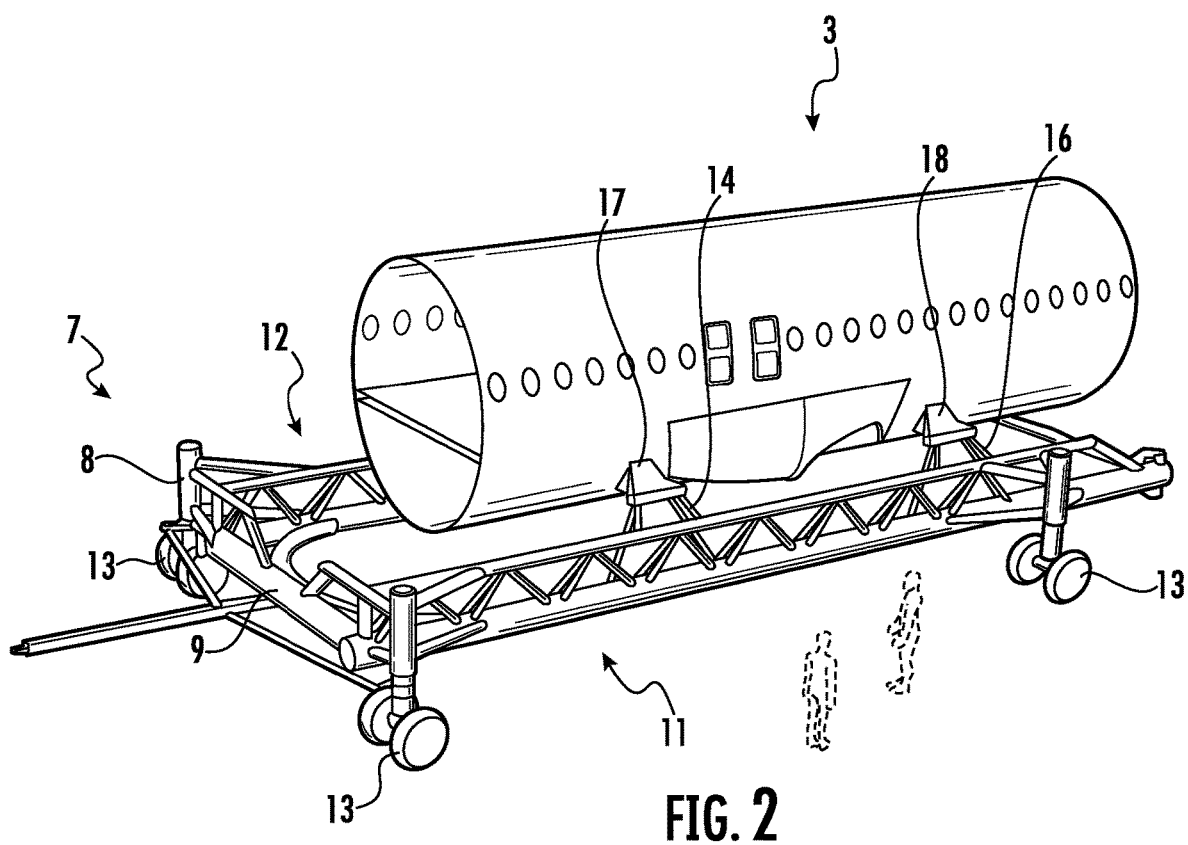
FIG. 2 is a perspective view of a central fuselage section carried by a transport trolley according to the disclosure herein.

In FIG. 2, the central section 3 is supported by a transport trolley 7 that is designed to carry the central section into the facility. This trolley comprises a tubular chassis 8 with an overall "U" shape, the base 9 of which is positioned close to the front of the section 3, and the branches 11 and 12 of which extend on either side of the section 3, the ends of these branches being located to the rear of the section 3.

This chassis 8 is in this case fitted with four running gears 13 enabling the chassis to move on the floor when towed by handling equipment. Each branch has two lateral carrying attachments 14, 16 that extend upwards and support the section 3. Each carrying attachment 14, 16 extends in an oblique direction oriented upwards and towards the other branch of the trolley. The section 3 is fitted with two lateral bearing inserts 17, 18 on each of the sides thereof, each bearing insert 17, 18 bearing against a corresponding carrying attachment 14, 16.

Advantageously, each insert bears against the corresponding receiving attachment and is fastened thereto by a mechanical locking system (not shown), such a locking system enabling the insert to be locked on the attachment with one or more degrees of freedom.

Figure 3:
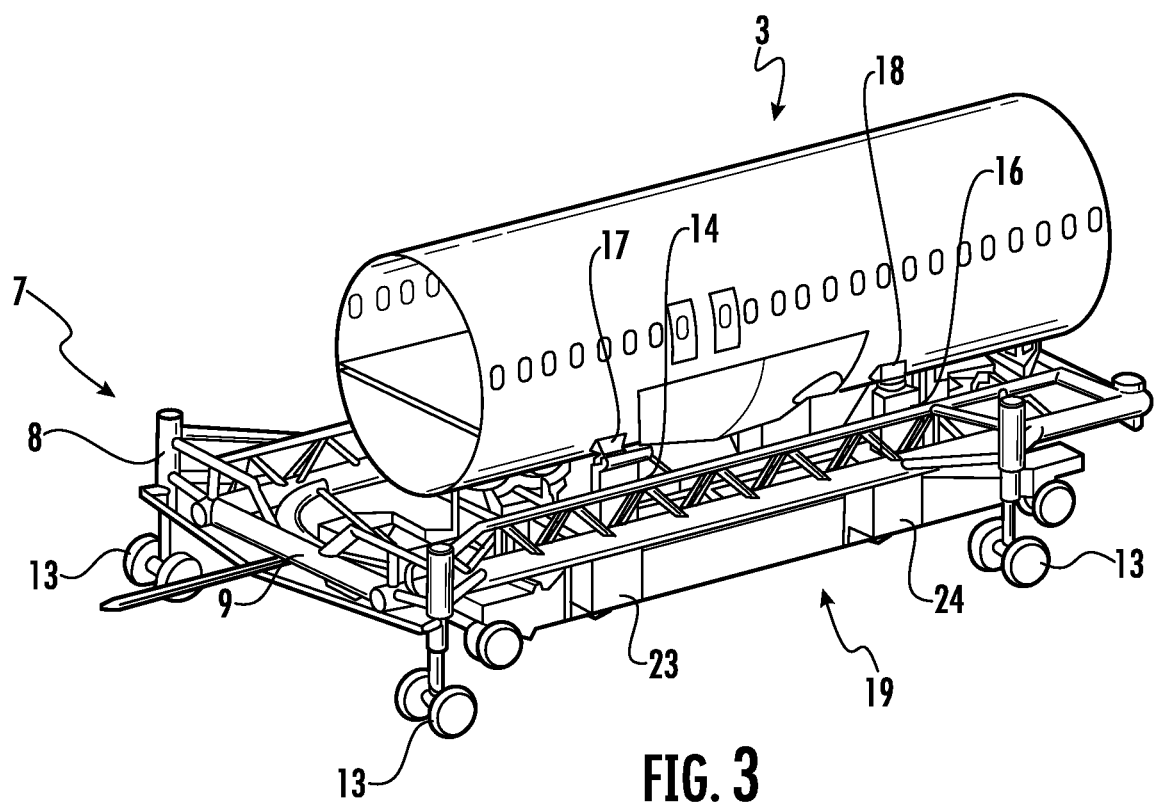
FIG. 3 is a perspective view of a central fuselage section during transfer from a transport trolley to a logistics trolley according to the disclosure herein.
Figure 4:
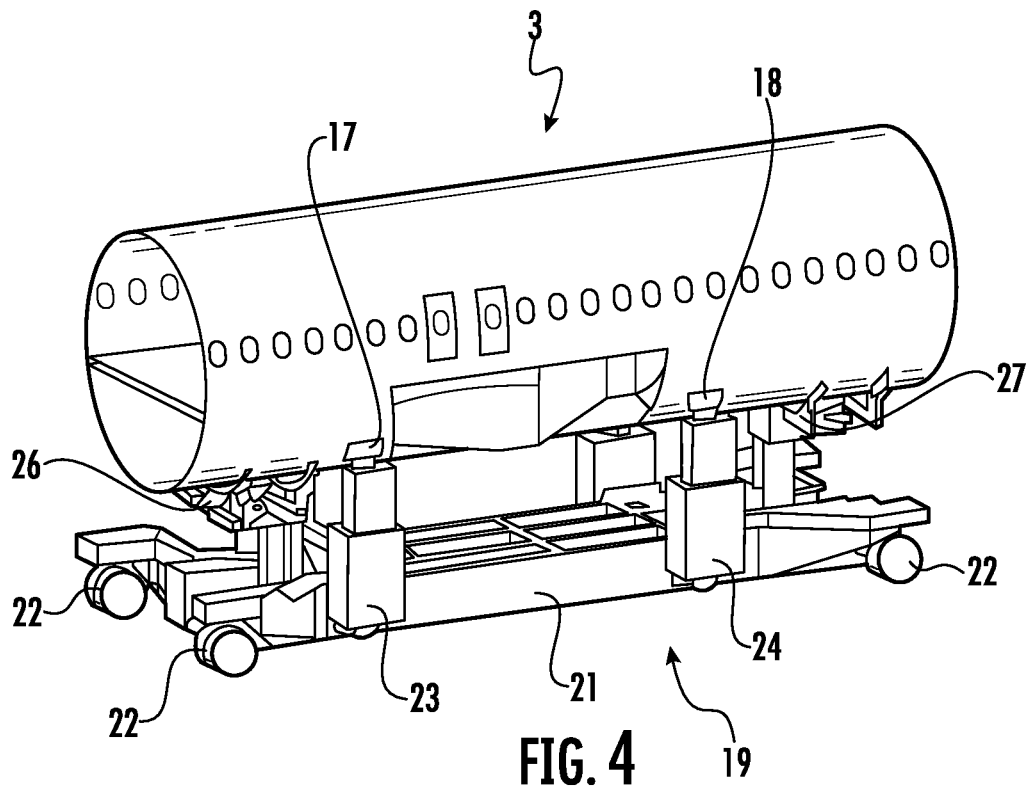
FIG. 4 is a perspective view of a central section installed on a logistics trolley according to the disclosure herein.

The central section 3 is conveyed into the assembly facility from an outside storage space using the transport trolley 7 to be installed therein on a logistics trolley indicated using reference sign 19 and shown in FIGS. 3 and 4.

The external dimensions of this logistics trolley 19 are less than the external dimensions of the transport trolley 7 to enable the logistics trolley to fit in the internal space delimited by the tubular chassis 8. More specifically, the logistics trolley 19 is narrower and shorter than the transport trolley 7, to enable the section 3 to be transferred from this transport trolley 7 to the logistics trolley 19.

As shown in FIG. 4, the logistics trolley 19 has a welded chassis 21 fitted with four running gears 22 enabling the trolley to be moved on the floor when towed by a suitable machine, and the trolley has four lateral load-bearing columns, two of these lateral load-bearing columns 23, 24 being visible in FIG. 4. When the section 3 is installed on the trolley 19, the section rests on the trolley and bears against the four load-bearing columns via the inserts 17, 18 thereof, as shown in FIG. 4.

Each insert advantageously bears against the corresponding receiving attachment and is fastened thereto by a mechanical locking system (not shown), to lock the insert on the attachment with one or more degrees of freedom.

Each load-bearing column is telescopic, i.e. the upper end thereof can be in a high position, as shown in FIG. 4, or lowered. Switching from one position to the other is for example performed by one or more operators, and a mechanical locking member is provided to ensure that each column is locked in the high position when effectively bearing the load represented by the weight of the section 3.

Complementarily, this trolley 19 has a front central lifting cradle 26 and a rear central lifting cradle 27 enabling the section 3 to be raised during transfer thereof from the transport trolley 7 to the logistics trolley 19, this operation corresponding to the situation shown in FIG. 3. Each cradle has two seats in the form of circular arcs oriented to open upwards, in order to be able to receive and mechanically support a lower portion of the outer face of the section 3.

Initially, the transport trolley 7 carrying the section 3 is maneuvered to be positioned about the logistics trolley 19, of which the lateral columns 23 and 24 and the lifting cradles 26 and 27 have been previously lowered, or the section 3 is moved to be positioned in the trolley 19. More specifically and as shown in FIG. 3, in this transfer situation, the transport trolley 7 surrounds the logistics trolley 19 with the two branches 11 and 12 thereof extending on either side of the logistics trolley 19, this logistics trolley 19 then being beneath the section 3, which is still being carried by the transport trolley 7. At this stage, the lifting cradles 26, 27 are commanded to rise in order to lift the central section 3 so that the central section is no longer resting via the inserts 17, 18 thereof on the attachments 14, 16 of the transport trolley 7, but temporarily on the logistics trolley 19 by the lifting cradles 26, 27.

Once this phase has been reached, the transport trolley 7 is maneuvered longitudinally away from this position, since the trolley is no longer supporting the section 3, in order to be withdrawn from the assembly station.

Once the transport trolley 7 has been withdrawn, operators deploy the lateral columns 23, 24 by lifting the upper ends thereof and mechanically locking same in the high positions thereof. The upper ends of the four lateral columns are then positioned vertically opposite the lateral inserts of the section 3, which is then carried temporarily by the lifting cradles 26, 27.

Once this situation has been reached, the lifting cradles 26, 27 are lowered to lower the section 3 and to bring the section to bear on the ends of the lateral columns by the lateral inserts thereof.

At this stage, the section has been transferred from the transport trolley to the logistics trolley and is properly supported and locked in position thereon.

Front Section

The front section 4 is transported from an outside storage space to the assembly facility using a transport trolley 28 of the same type as the transport trolley 7.

Figure 5:
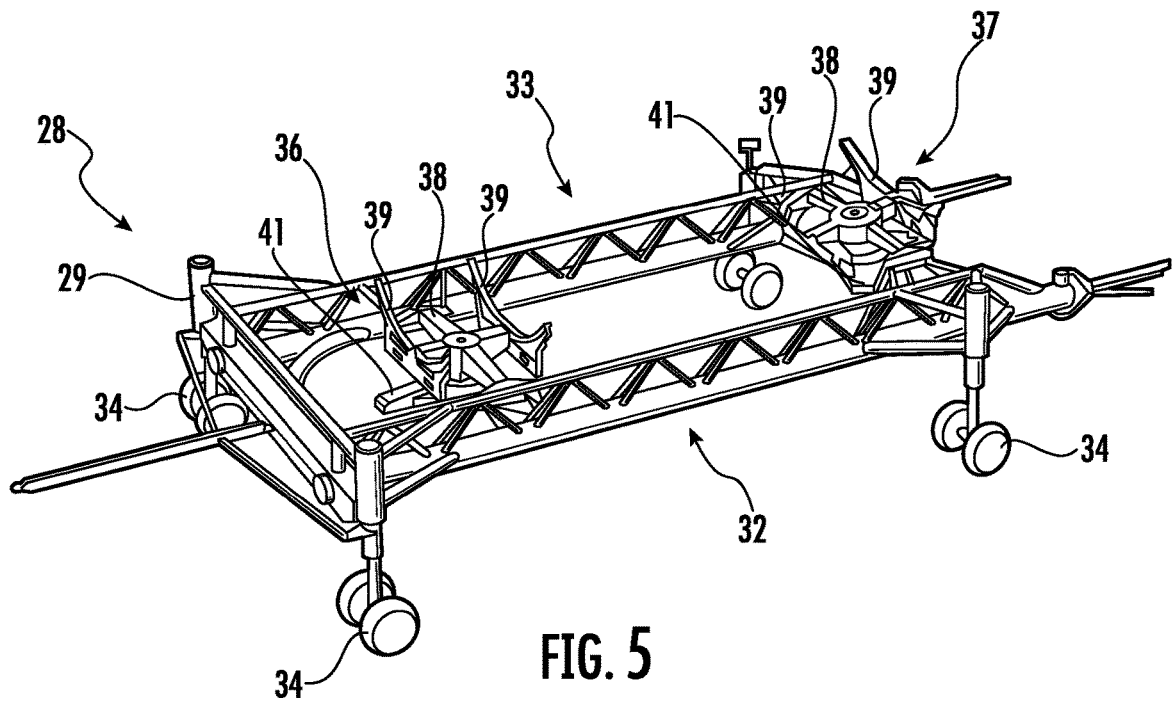
FIG. 5 is a perspective view of a front-fuselage-section transport trolley according to the disclosure herein.
Figure 6:
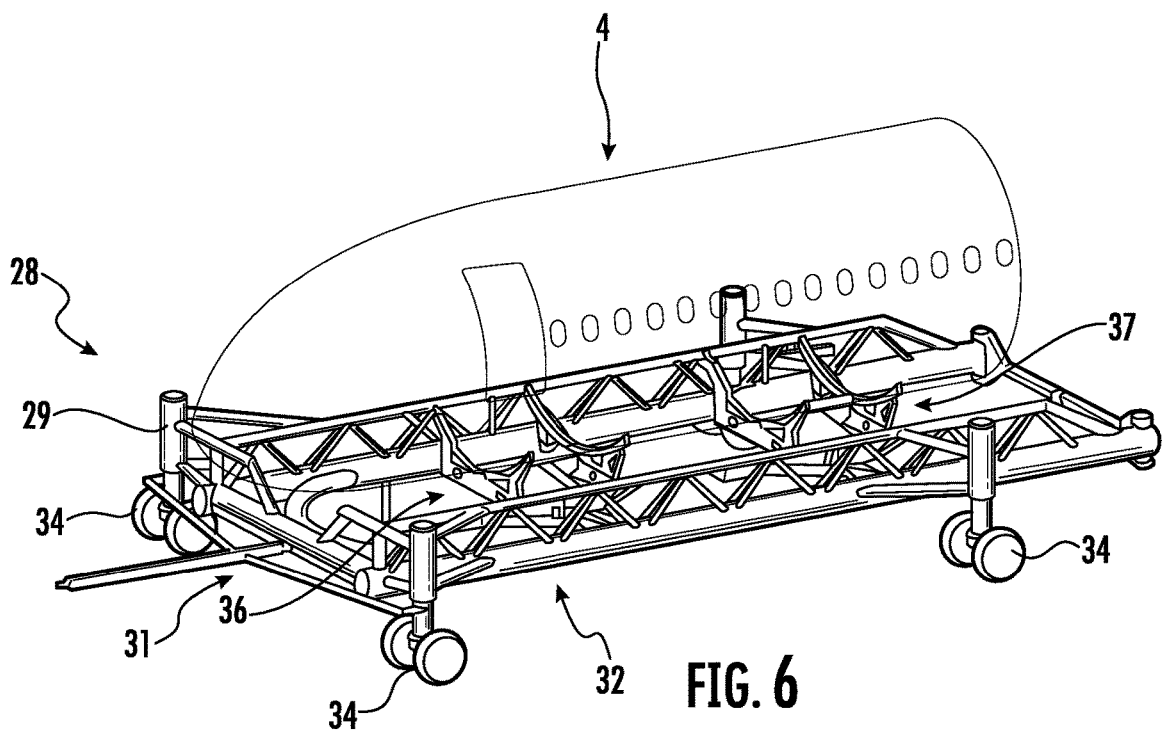
FIG. 6 is a perspective view of a front fuselage section carried by a transport trolley according to the disclosure herein.

As shown in FIGS. 5 and 6, the transport trolley 28 has a tubular chassis 29 having an overall "U" shape, the base 31 of which is positioned near to the front of the section 4, which is the end of this section 4 opposite the end to be rigidly connected to another section.

This chassis 29 has two branches 32 and 33 extending on either side of the section 4, the ends of these branches being positioned to the rear of the section 4. This chassis 29 is in this case fitted with four running gears 34 enabling the chassis to move on the floor when towed by handling equipment.

The chassis 29 supports a front central cradle 36 and a rear central cradle 37 that receive the front section 4, each cradle being positioned between and held by the two branches.

Each cradle 36, 37 in this case comprises a cruciform central structure 38 with two transverse opposing branches, each of which is connected to a branch 32, 33 of the tubular chassis 29 by a pivot link, each of the two longitudinally opposing branches carrying a circular-arc-shaped seat, indicated using reference sign 39, as well as a lower portion carrying a lower coupling plate 41.

The circular-arc seats 39 are oriented to open upwards, in order to receive and mechanically support a lower portion of the outer face of the section 4. Furthermore, the pivot links by which each cradle is carried by the branches of the chassis enable these cradles to pivot about a horizontal transverse axis.

Figure 7:
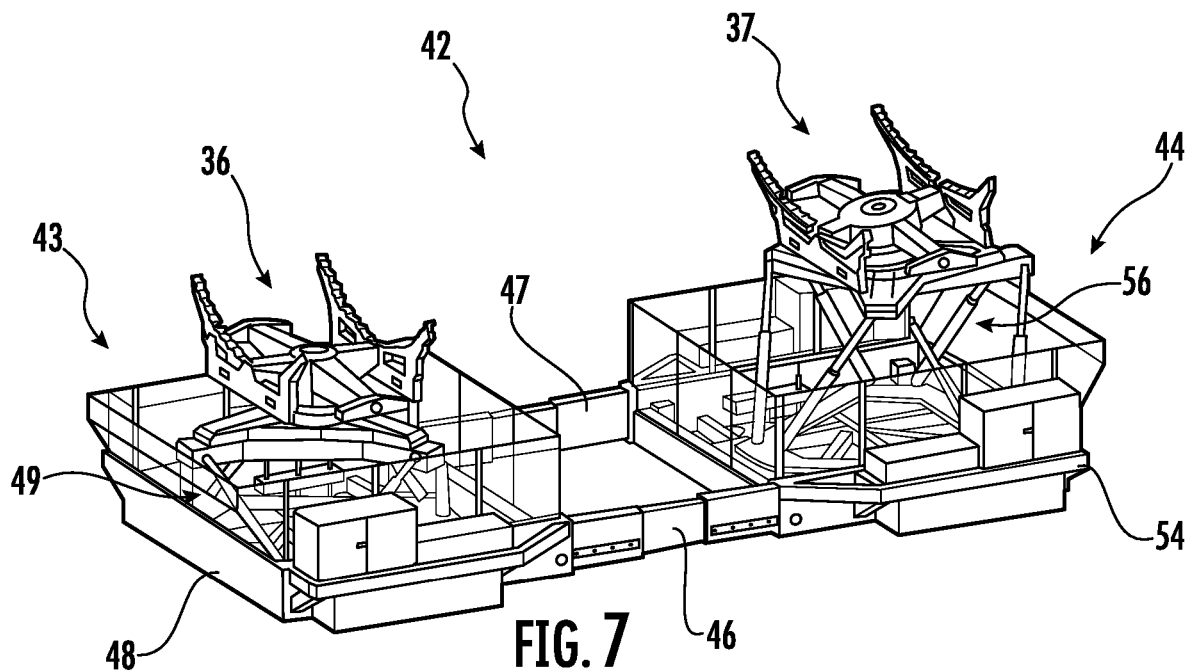
FIG. 7 is a perspective view of an adjustable support designed to receive a front fuselage section according to the disclosure herein.

When the front section is carried by the transport trolley 28, as shown in FIG. 6, the section is supported entirely by the cradles 36 and 37, and these cradles 36 and 37 are transferred with the front section 4 when this front section 4 is transferred to an adjustable support 42, such an adjustable support being shown in FIG. 7.

As shown in FIG. 7, this adjustable support 42 has a front portion 43 and a rear portion 44 that are rigidly connected to one another by two longitudinally oriented lateral arms 46, 47 that are in this case telescopic, i.e. adjustable in length to adjust the distance separating the front portion from the rear portion where necessary.

Figure 8:
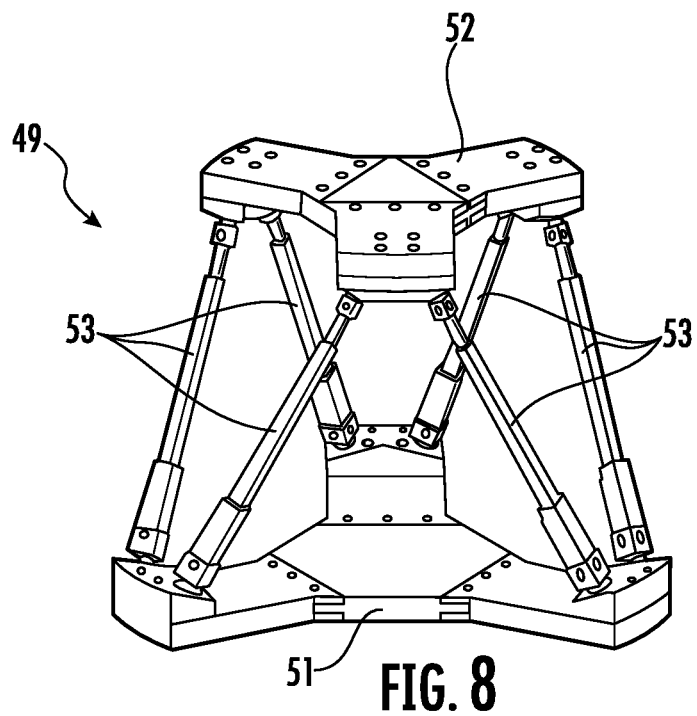
FIG. 8 is a perspective view of a hexapod that is part of the adjustable support according to the disclosure herein.

The front portion has a base 48 supporting a hexapod 49 shown alone in FIG. 8. As is known, this hexapod 49 has a lower plate 51 and an upper plate 52 that are linked to one another by six mechanical or controlled hydraulic jacks 53.

As is known, the jacks can be controlled to move the upper plate 52 in relation to the lower plate 51 with the normal six degrees of freedom (three rotational and three translational) precisely and while carrying a heavy load.

As shown in FIG. 7, the upper plate 52 of the hexapod 49 is carrying the front central cradle 36, which is rigidly connected to this plate using removable mechanical. The rear portion similarly has a base 54 carrying another hexapod, indicated using reference sign 56, of the same type as the front portion, this rear hexapod carrying the rear central cradle 37, which is also rigidly connected to the upper plate thereof using removable mechanical structure.

The bases 48 and 54 can be moved on the floors supporting the bases, for example using running gears (not shown) fitted thereto. Furthermore, the external dimensions of the support 42 are less than the external dimensions of the transport trolley 28 to enable the logistics trolley to fit in the internal space delimited by the tubular chassis 29. More specifically, the support 42 is narrower and shorter than the transport trolley 28, to enable the section 4 to be transferred from this transport trolley 28 to the support 42.

Figure 9:
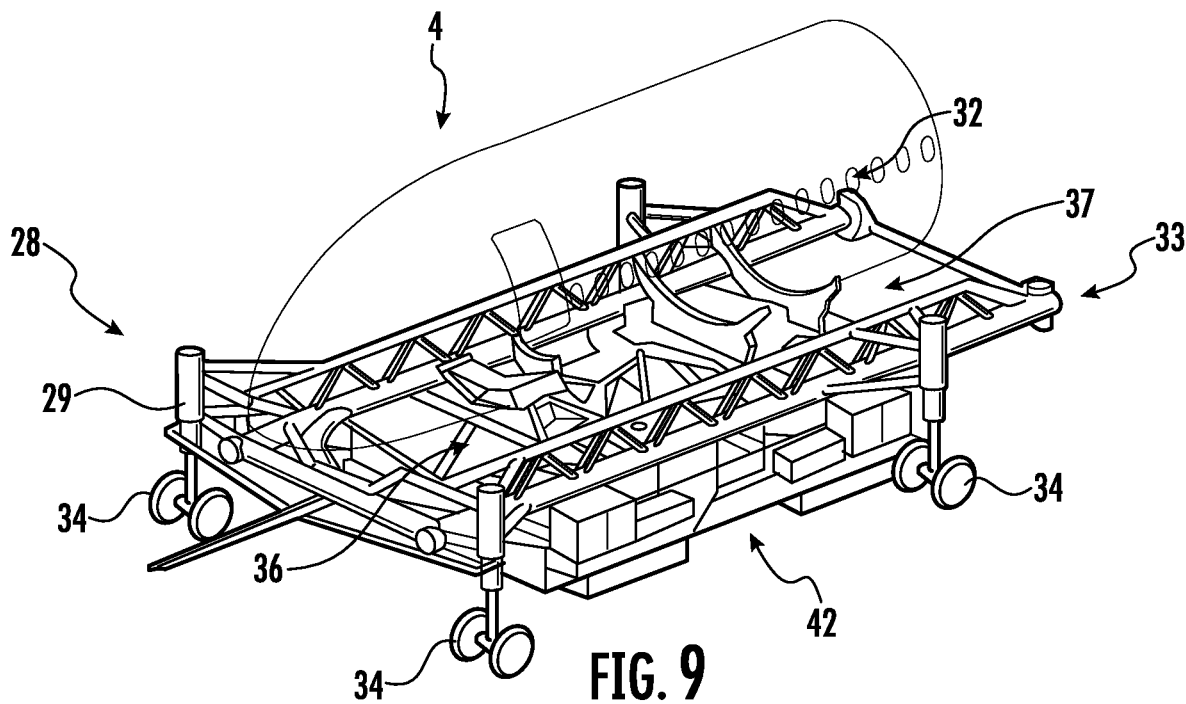
FIG. 9 is a perspective view of a front fuselage section during transfer from a transport trolley to an adjustable support according to the disclosure herein.

To transfer the section 4 to the adjustable support 42, the hexapods 49 and 56, the upper plates of which are then not carrying the cradles 36 and 37, are first commanded to lower the upper plates thereof. The transport trolley 28 carrying the section 4 is then maneuvered to be positioned about the adjustable support 42. As shown in FIG. 9, in this transfer situation, the transport trolley 28 surrounds the adjustable support 42 with the two lateral branches 32 and 33 thereof extending on either side of the support 42, which is then beneath the section 4 carried by the trolley 28.

At this stage, the hexapods are commanded to raise the upper plates thereof and to mechanically couple the plates to the cradles 36 and 37, which are still being held by the trolley 28.

Advantageously, each cradle 36, 37 has a hole in the central region thereof forming a female interface that is designed to receive a matching stud rigidly fastened to and projecting from a lower portion of the section 4 to form a matching male interface. This stud has a bulb-shaped end to form a ball-joint connection with the female interface in which the stud is engaged. The engagement of the stud in the female interface when raising a cradle carried by a hexapod ensures that the cradle is precisely positioned in relation to the section 4 in the transverse direction and the longitudinal direction. In other words, the engagement of the stud in the female interface ensures that the cradle is precisely centered in relation to the section carried by the cradle.

Complementarily, the interface formed by the stud and the corresponding hole can be arranged to also ensure that the elements are locked in relation to one another in an essentially vertical direction.

Once the upper plates of the hexapods have been coupled to the cradles, the central structure 38 of each cradle is mechanically disconnected from the branches of the trolley 28. For this purpose, the pivot link of each transverse branch of the structure 38 can be disassembled, this disassembly possibly being carried out by an operator or automatically.

Figure 10:
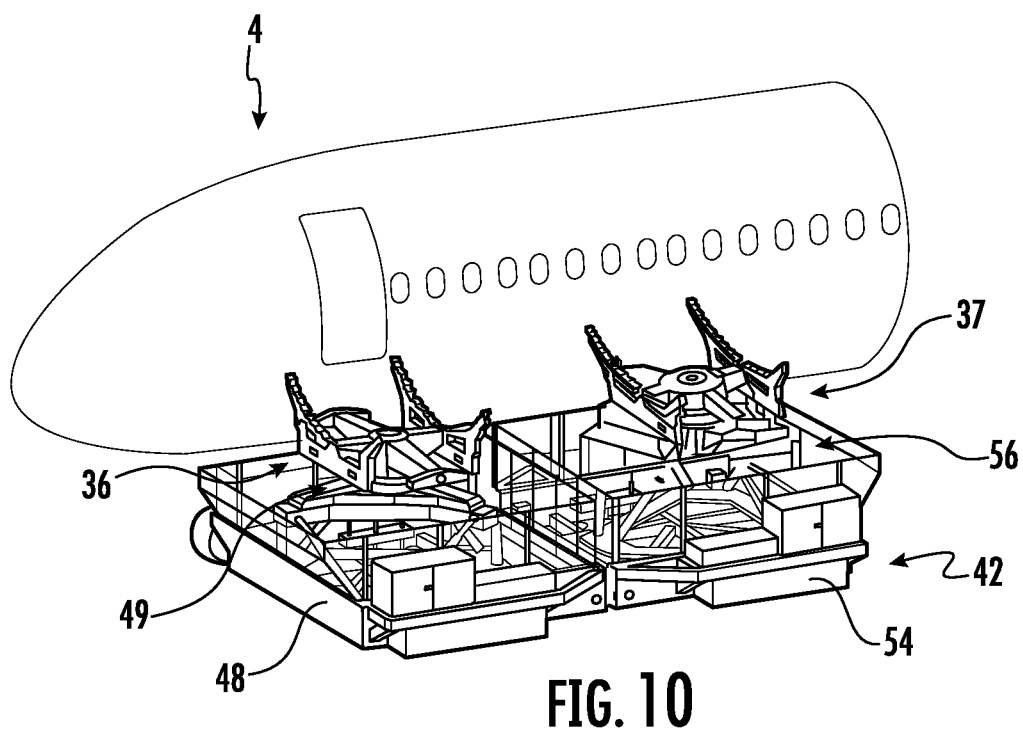
FIG. 10 is a perspective view of a front fuselage section positioned on an adjustable support according to the disclosure herein.

In this situation, the front section is carried by the cradles 36 and 37, which are in turn carried by the hexapods 49 and 56 instead of being carried by the trolley 28. Once this phase has been reached, the transport trolley 28 is withdrawn longitudinally, since the trolley is no longer supporting the section 4, which corresponds to the situation in FIG. 10.

Rear Section

The rear section 6 is transported from an outside storage space to the assembly facility in the same way as for the front section 4, and is also installed in the assembly facility on another adjustable support.

Figure 11:
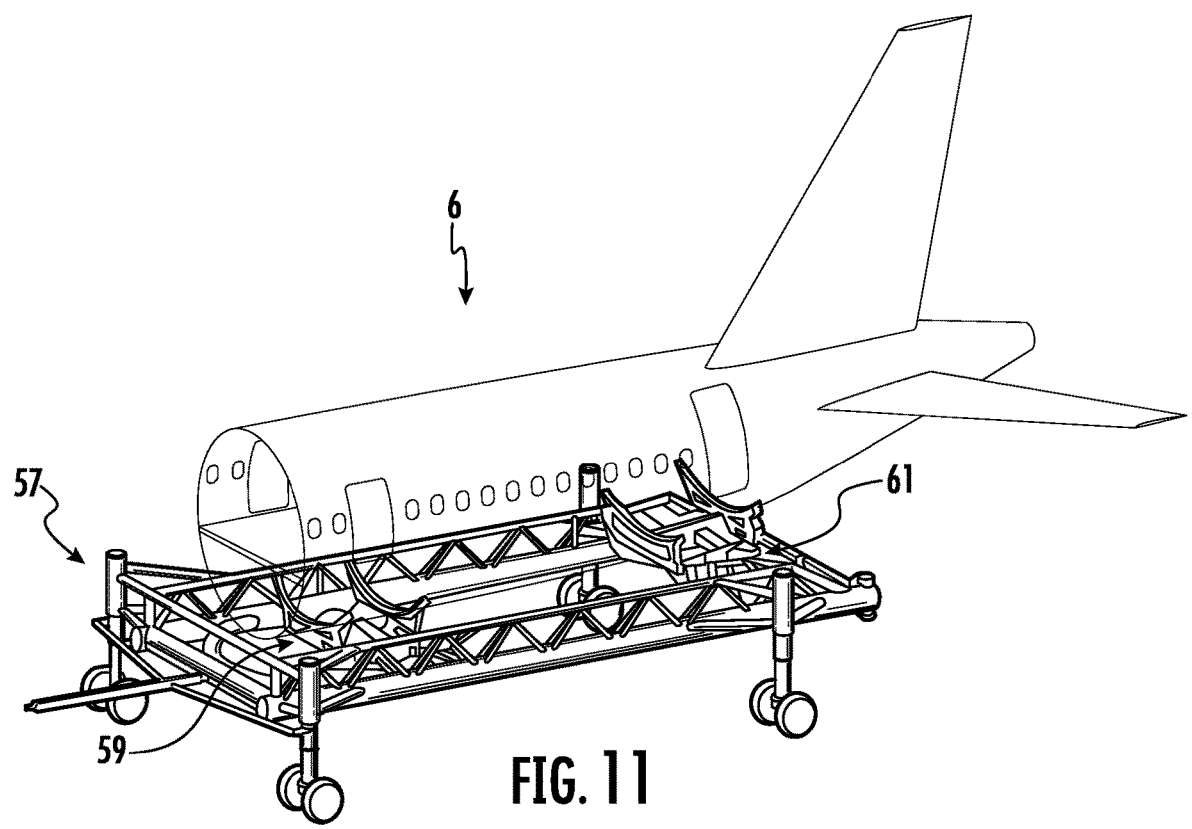
FIG. 11 is a perspective view of a rear fuselage section positioned on a transport trolley according to the disclosure herein.
Figure 12:
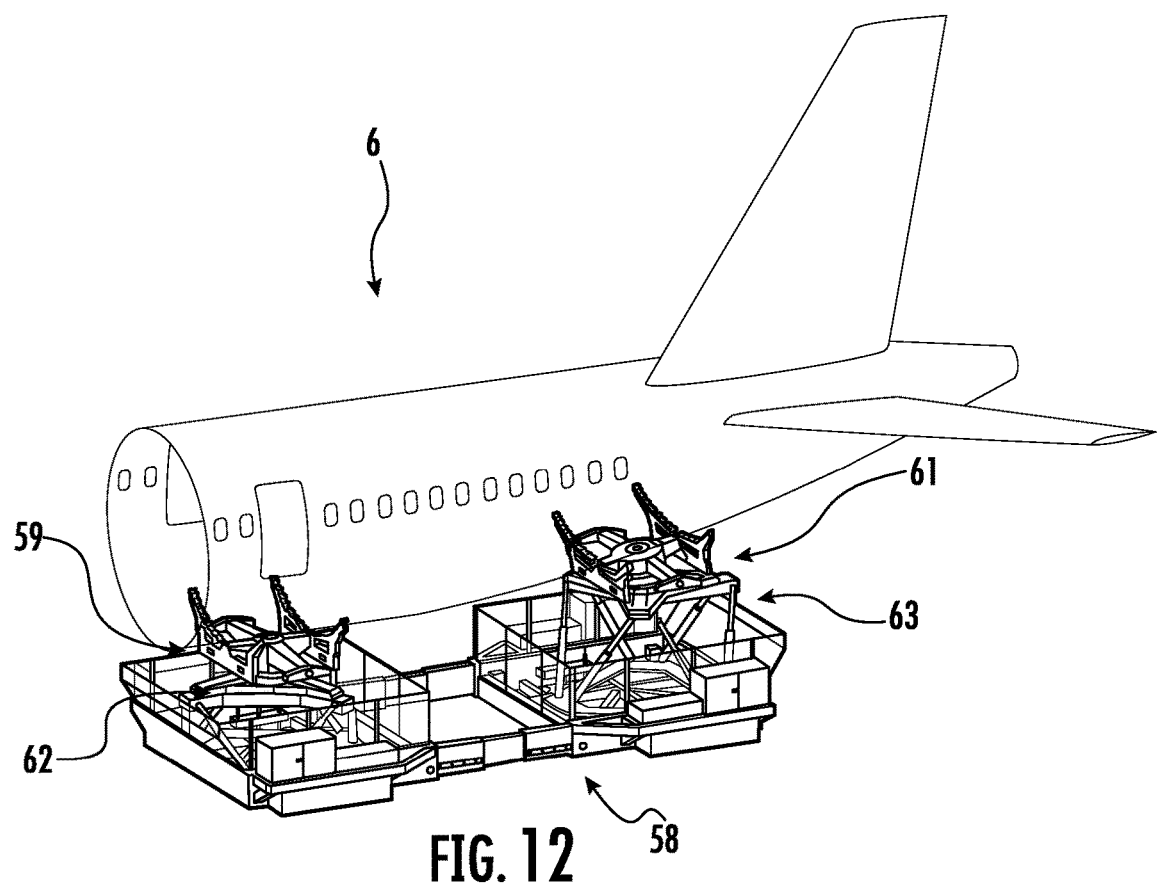
FIG. 12 is a perspective view of a rear fuselage section carried by an adjustable support according to the disclosure herein.

As shown in FIG. 11, transportation is carried out using a transport trolley 57 that is identical to the trolley 28, and this rear section 6 is transferred from the trolley 57 onto another adjustable support, indicated using reference sign 58 in FIG. 12, which is identical to the support 42. Thus, in the same way as for the front section 4, the rear section 6 is transported on the trolley 57 and supported therein by a front central cradle 59 and a rear central cradle 61 that are linked to this trolley by transverse-axis pivot links.

Transfer thereof to the adjustable support 58 is performed by positioning the trolley 57 about this support 58, the two hexapods 62 and 63 of which have been previously lowered. The hexapods are then commanded to mechanically couple the upper plates thereof to the cradles 59 and 61, after which the central structures of these cradles are disassembled from the branches of the trolley 57 so that this trolley can be withdrawn in order to arrive at the situation illustrated in FIG. 12, in which the rear section 6 is supported only by the adjustable support 58.

Assembly of the Fuselage

In general, the logistics trolley 19, which is a rolling trolley, is first installed in the reference position thereof in the assembly facility and immobilized in this position. The adjustable supports, which can also be moved on the floor, are positioned away from the logistics trolley, away from the respective reference positions thereof.

The central section 3 is then carried into the assembly facility from an outside storage area by the transport trolley 7. The transport trolley 7 is maneuvered to be positioned about the logistics trolley 19 in order to transfer the central section 3 onto the logistics trolley 19, after which the transport trolley 7 is withdrawn.

The adjustable support 42 is then moved to be installed in the reference position thereof, i.e. in line with the logistics trolley 19 in order to receive the front section 4 so that the section is in line with the front end of the central section 3.

The front section 4 is then carried into the assembly facility from an outside storage area by the transport trolley 28, which is maneuvered to be positioned about the adjustable support 42 to transfer the front section 4 onto this support 42, before withdrawing the trolley 28. Following this transfer, the front section 4 is carried by the two hexapods of the support 42 by the cradles 36 and 37, which have been transferred together with the front section 4.

The adjustable support 58 is then moved and installed in the reference position thereof, i.e. in line with the logistics trolley 19 in order to receive the rear section 6 so that the section extends into the rear end of the central section 3.

The rear section 6 is then carried into the assembly facility from an outside storage area by the transport trolley 57, which is maneuvered to be positioned about the adjustable support 58 to transfer the rear section 6 onto this support 58, before withdrawing this trolley 57. Following this transfer, the rear section 6 is carried by the two hexapods of the support 58 by the cradles, which have been transferred together with the rear section 6.

Figure 13:
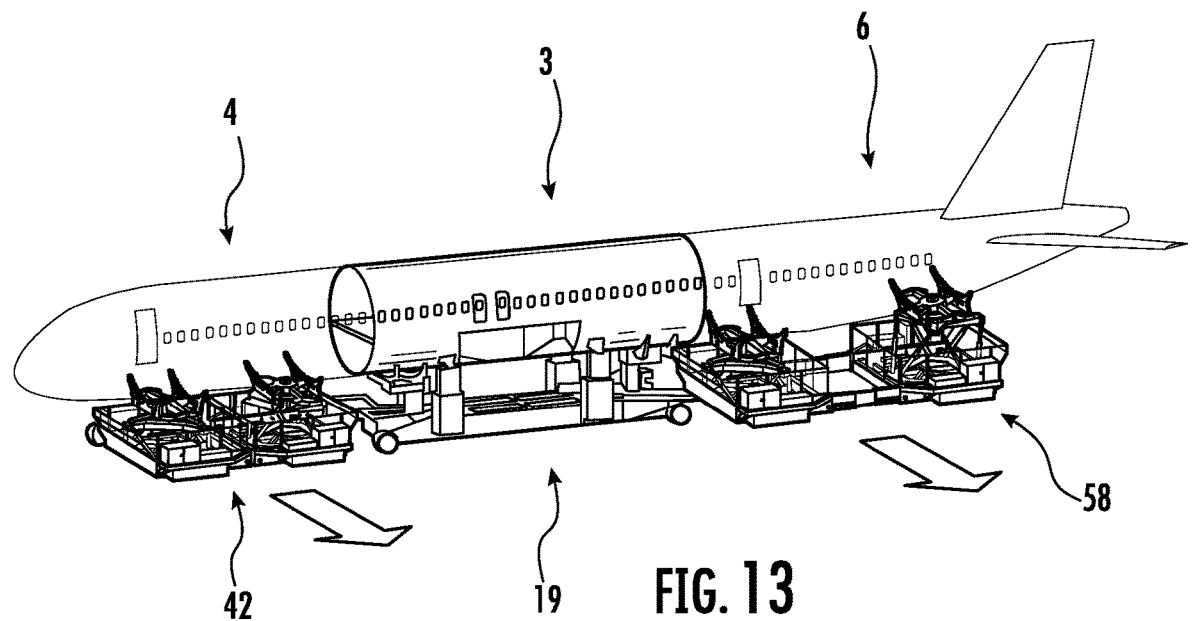
FIG. 13 is an overview of the three fuselage sections installed ready for assembly according to the disclosure herein.

Once everything is in place, the front section 4 is carried by the adjustable support 42, the central section 3 is carried by the logistics trolley 19, and the rear section 6 is carried by the adjustable support 58, which corresponds to the situation shown in FIG. 13.

The edge of the rear end of the front section 4 is then approximately opposite the edge of the front end of the central section 3, in order to be rigidly connected thereto, and this assembly can be carried out by riveting, welding or any other appropriate approach as a function of the type of materials present.

This assembly, also referred to as an orbital joint, requires very precise positioning of the edge of the rear end of the front section 4 in relation to the edge of the front end of the central section 3. In other words, for this joint to be made effectively, the front section 4 must be in geometric conformity with the central section 3, so that the circular edges of the upstream section and the downstream section are close enough to one another about the entire circumference thereof.

In consideration of potential geometric defects on each edge (circularity defects or flatness defects or other defects), ensuring geometric conformity requires one of the sections to be moved in relation to the other through six degrees of freedom.

Geometric conformity is ensured by commanding the hexapods of the support 42 to move the front section 4 until the optimum position is reached, i.e. the position in which the distance between the edges is lowest about the entire circumference. The six degrees of freedom of each hexapod enable the front section to be moved in translation along the three normal axes, and also in rotation about each of these three axes.

In practice, a series of measurements is taken to characterize the distance between the two edges at different points, for example with a laser measurement system to determine the horizontal distance separating one edge from the other at several points.

The hexapods are then commanded to move the section to a new position to reduce these distances. Several passes can then be carried out successively with decreasing amplitude such as to gradually reach an optimal level of geometric conformity.

Once geometric conformity has been reached, the orbital joint can be made to rigidly connect the front section 4 to the central section 3.

Similarly, the hexapods of the adjustable support 58 are then commanded to move the rear section 6 in relation to the central section to minimize the distance between the circular edge of the rear end of the central section 3 and the circular edge of the front end of the rear section 6. Once the position of the rear section 6 guarantees that the geometric conformity criteria of the rear orbital joint have been satisfied, this joint is made to rigidly connect the rear section to the central section.

Once the orbital joints have been made, the hexapods 49, 56 of the adjustable support 42 are lowered, the front section 4 then being carried by the central section 3, to which the section is rigidly connected. Lowering the hexapods thus completely releases the support 42 from the load being carried, enabling the support to be withdrawn laterally and moved to a standby position.

Similarly, the hexapods 62 and 63 are also lowered in order to withdraw the adjustable support 58 and to move the support to a standby position, the rear section 6 then being entirely supported by the central section 3 to which the section is rigidly connected.

Under such conditions, the whole of the fuselage is carried by the central section 3 thereof, which is only supported by the logistics trolley 19, which is also a rolling trolley enabling the fuselage to be moved on the floor so as to be conveyed to another assembly station or out of the facility once assembly thereof has been completed.

As shown in the figures, each end of the branches 11 and 12 of the trolley 19 is fitted with a stabilization arm, which arms can each be opened to extend the branch carrying the arm, which enables the tubular chassis 8 to be extended about the fuselage.

Once the fuselage section is in place on the trolley 19, the stabilization arms are joined by moving the arms towards one another, and rigidly connecting them to one another via the ends thereof to close the chassis. This helps to stiffen the rear end of the trolley to enable the trolley to be moved while carrying the fuselage section.

Variants

In the example shown in FIGS. 1 through 13, the adjustable supports used include hexapods, which makes it possible to adjust the position of the fuselage section being carried according to six degrees of freedom.

Alternatively, the adjustable supports can be designed to essentially comprise a frame carrying a front central cradle and a rear central cradle that can be moved vertically in relation to the frame, the frame being installed on the floor on movable plates enabling the frame to be moved on the floor.

The movement of the cradles then enables the fuselage section to be moved vertically when the cradles are moved together, and to be pivoted about a transverse horizontal axis when for example just one of the cradles is commanded to move.

Each cradle is carried by two vertically movable side pillars such that the vertical movement of a single side pillar of each cradle enables the fuselage to be pivoted about a longitudinal axis. The cradles therefore enable the fuselage to be moved about three degrees of freedom.

Complementarily, the mobility of the frame on the floor enables the fuselage to be moved in translation along two parallel horizontal axes and to be pivoted about a vertical axis.

The position of the fuselage section can thus be adjusted in six degrees of freedom to be positioned in geometric conformity.

Figure 14:
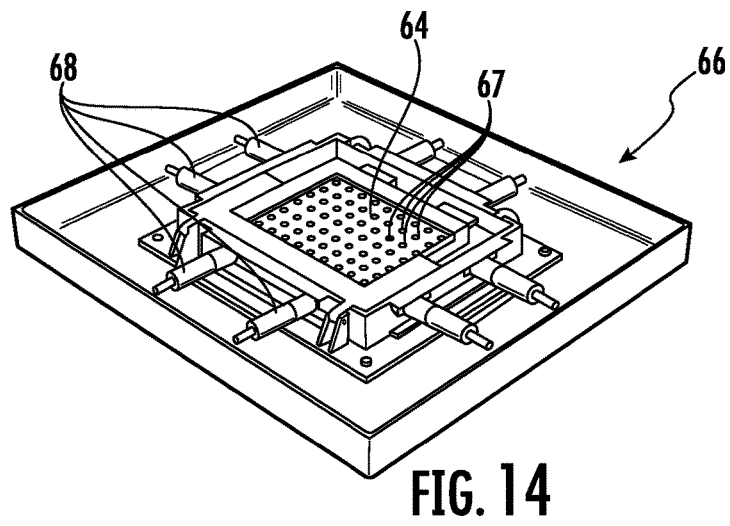
FIG. 14 is an overview of a movable plate according to the disclosure herein.

As shown in FIG. 14, a portion of the floor of the assembly facility is fitted with a horizontal movable plate 64 that can be moved locally in parallel with itself inside a housing 66, i.e. with an amplitude of movement that is limited by the dimensions of the housing carrying the plate. This housing 66 is installed in an appropriate recess formed in the floor and is rigidly connected thereto.

The plate 64 is fitted with a set of steel balls 67 that are uniformly distributed over the lower face thereof, enabling the plate to roll on the bottom of the housing while bearing a significant vertical load. Complementarily, elastic return 68 tends to re-center the plate in the housing, such that this plate spontaneously returns to a central position in the housing when not bearing any load.

First Variant

Figure 15:
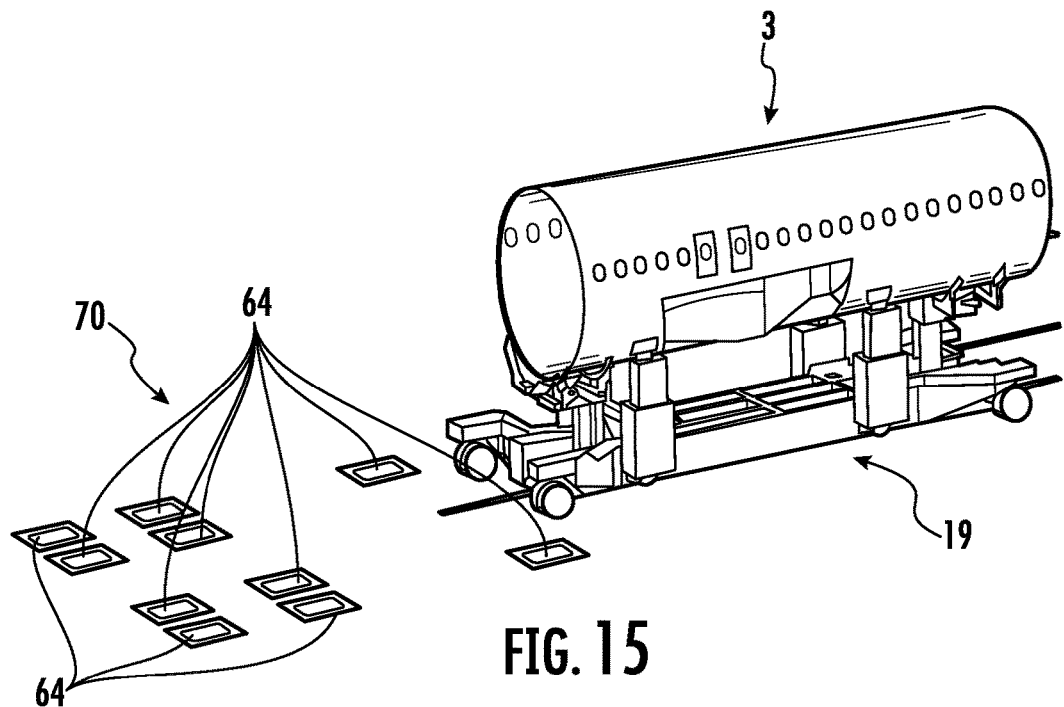
FIG. 15 is an overview showing a central section carried by a logistics trolley opposite a set of movable plates installed in the floor to receive a frame carrying a front section according to a first variant of the disclosure herein.
Figure 16:
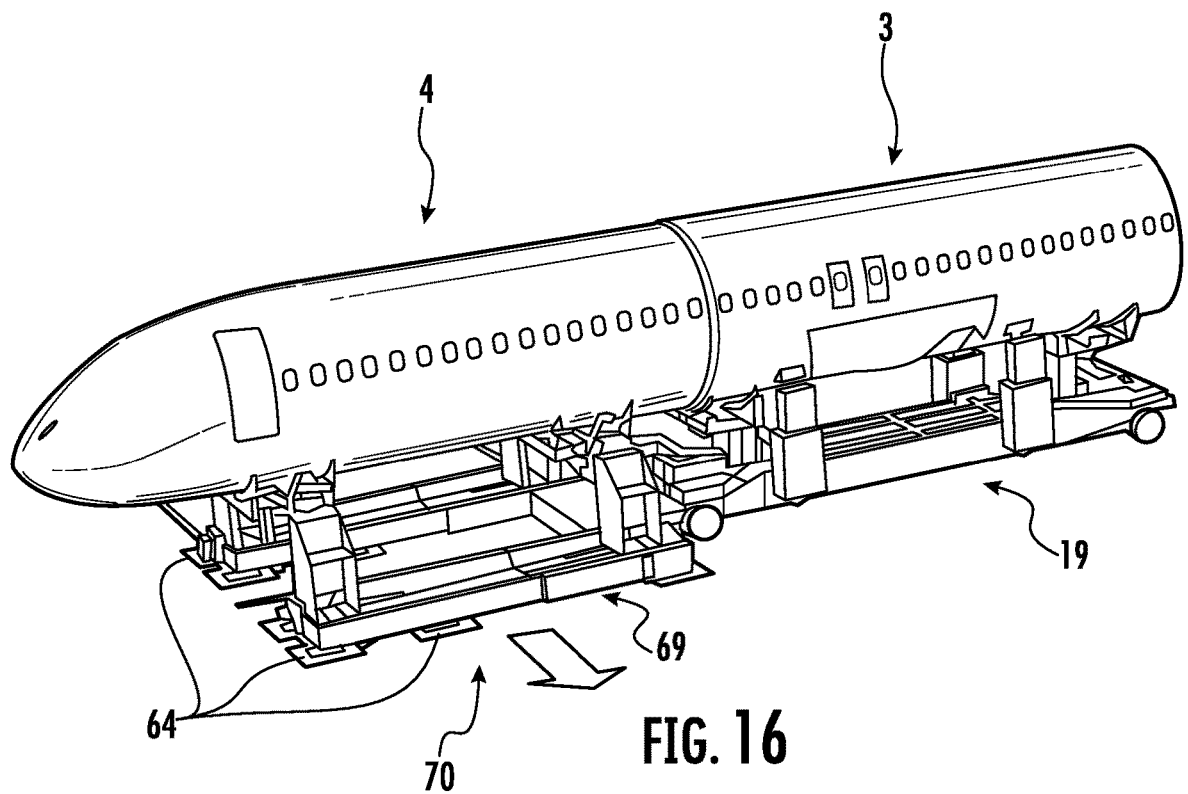
FIG. 16 is an overview showing a central section carried by a logistics trolley opposite a front section carried by a frame supported by movable plates according to the first variant of the disclosure herein.

As shown in FIG. 15, the floor of the assembly facility is fitted with eight separate movable plates 64 that are arranged in a rectangle arranged in line with and in front of a logistics trolley 19 carrying a central section 3, these plates 64 being designed to jointly carry a frame 69 fitted with two cradles carrying a front section 4, as shown in FIG. 16.

The frame 69 is advantageously moved, with the front section 4 carried thereby, using handling equipment (not shown), to be installed directly in the location thereof, such as to be fully supported by the eight plates 64 such as to form an adjustable support 70 therewith.

Figure 17:
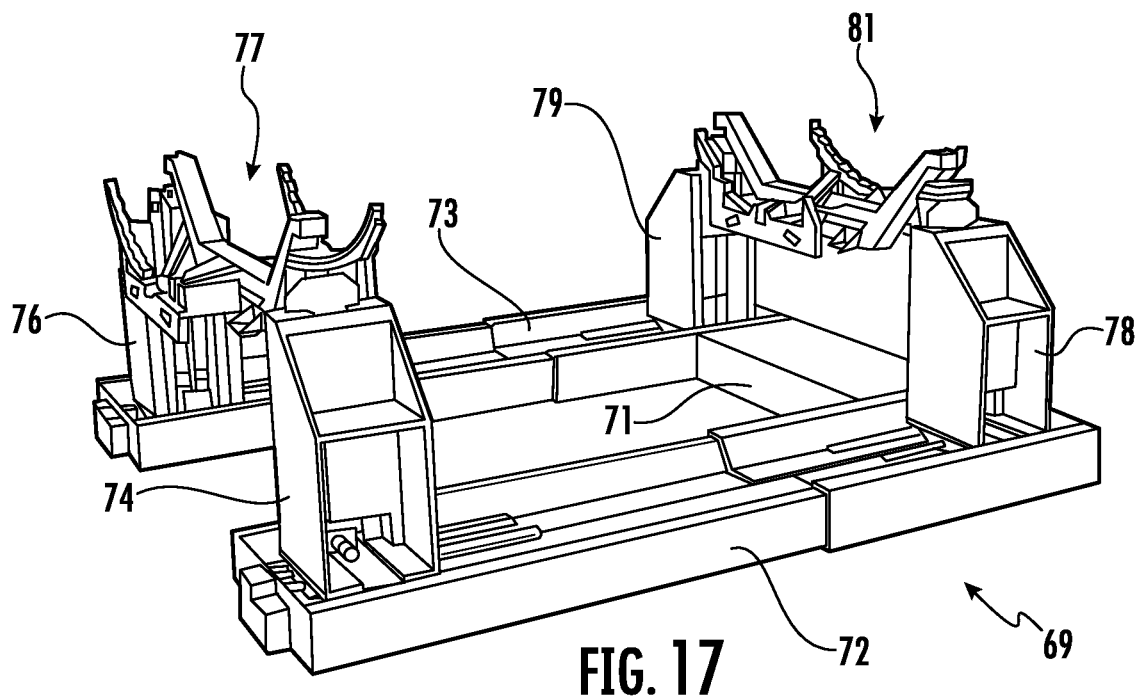
FIG. 17 is a perspective view of a frame fitted with two cradles that is designed to support a front section according to the first variant of the disclosure herein.

As shown in greater detail in FIG. 17, this frame 69 has an overall "U" shape comprising a base 71 extended by a left-hand lateral branch 72 and a right-hand lateral branch 73 that are parallel to one another. The left-hand lateral branch 72 carries a left-hand front pillar 74 at the front end thereof and the right-hand lateral branch 73 carries a right-hand front pillar 76 at the front end thereof. These two front pillars 74, 76 carry a front central cradle 77. These front pillars are fitted with motorized structure controlled jointly to raise or lower the front central cradle 77 carried thereby.

The left-hand lateral branch 72 carries a left-hand rear pillar 78 at the connection thereof with the base 71, and the right-hand lateral branch 73 carries a right-hand rear pillar 79 at the connection thereof with the base 71. These two rear pillars 78, 79 carry a rear central cradle 81. These rear pillars are fitted with motorized structure controlled jointly to raise or lower the rear central cradle 81 carried thereby.

Once the frame 69 carrying the front section 4 has been installed, the frame is moved in relation to the floor by the movable plates 64 on which the frame rests in order to move the front section 4 longitudinally and transversely and to pivot the front section about a vertical axis, in order to pre-position the whole in relation to the central section 3.

The four pillars can then be controlled jointly to adjust the height of the edge of the rear end of the front section 4 with the height of the edge of the front end of the central section 3. The two front pillars are then controlled to adjust the inclination of the front section 4, after which the left- and right-hand pillars can be actuated to pivot the front section about the longitudinal axis thereof.

Instead of being ensured by the pillars, the final positioning of the front section 4 can be ensured using hexapods in a manner similar to the example embodiment explained above.

Once these operations have been carried out, the front orbital joint can be made to rigidly connect the front section to the central section.

Similarly, the rear section 6 of the fuselage is installed on an adjustable support of the same type as the support 70, which is then controlled to position this rear section 6 so as to position it in geometric conformity with the central section, in order to make the rear orbital joint rigidly connecting the central section to the rear section.

In this first variant, as shown in FIGS. 1 through 13, once the two orbital joints have been made, the front adjustable support and the rear adjustable support are commanded to lower the related cradles thereof, before these supports are withdrawn laterally so that the assembly of the fuselage is resting only on the logistics trolley 19.

Second Variant

In the first variant, the front section is moved together with the frame 69 incorporated in the adjustable support 70 using handling equipment (not shown).

Alternatively, the adjustable support has a frame that is installed on movable plates before the front section is moved by a transport trolley.

Figure 18:
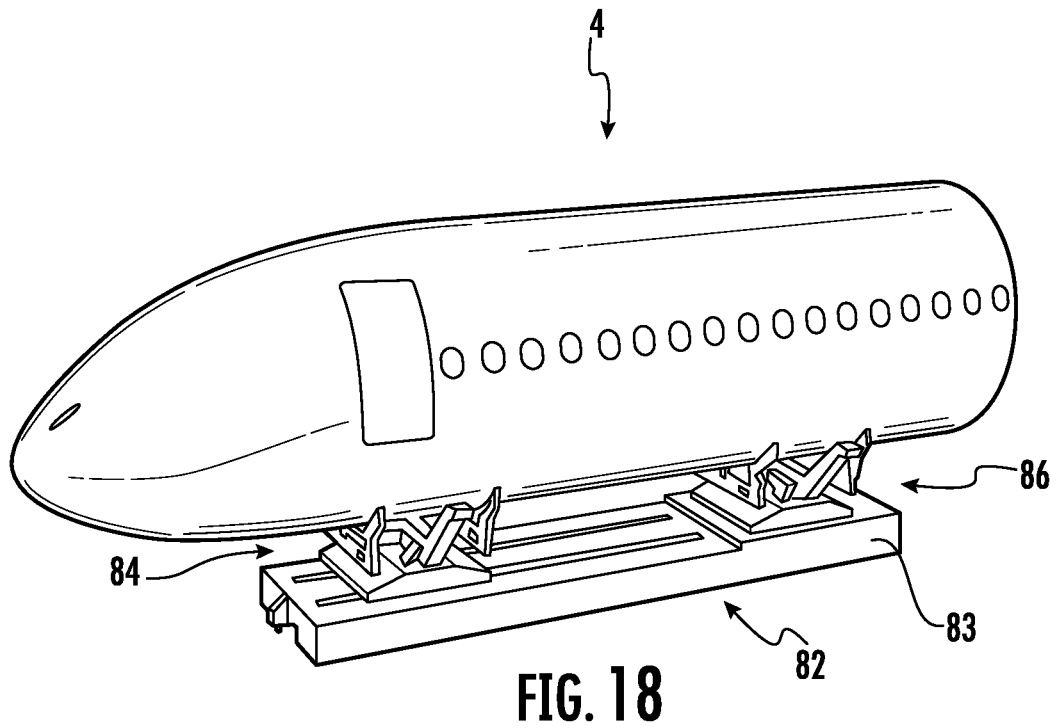
FIG. 18 is a perspective view of a front section carried by a transport trolley according to a second variant of the disclosure herein.

As shown in FIG. 18, such a transport trolley, indicated using reference sign 82, essentially comprises a rolling chassis 83 that is relatively narrow, carrying a front cradle 84 and a rear cradle 86 that are fastened to one another in relation to the chassis 83, and that are used by the chassis to carry the front section 4.

Figure 19:
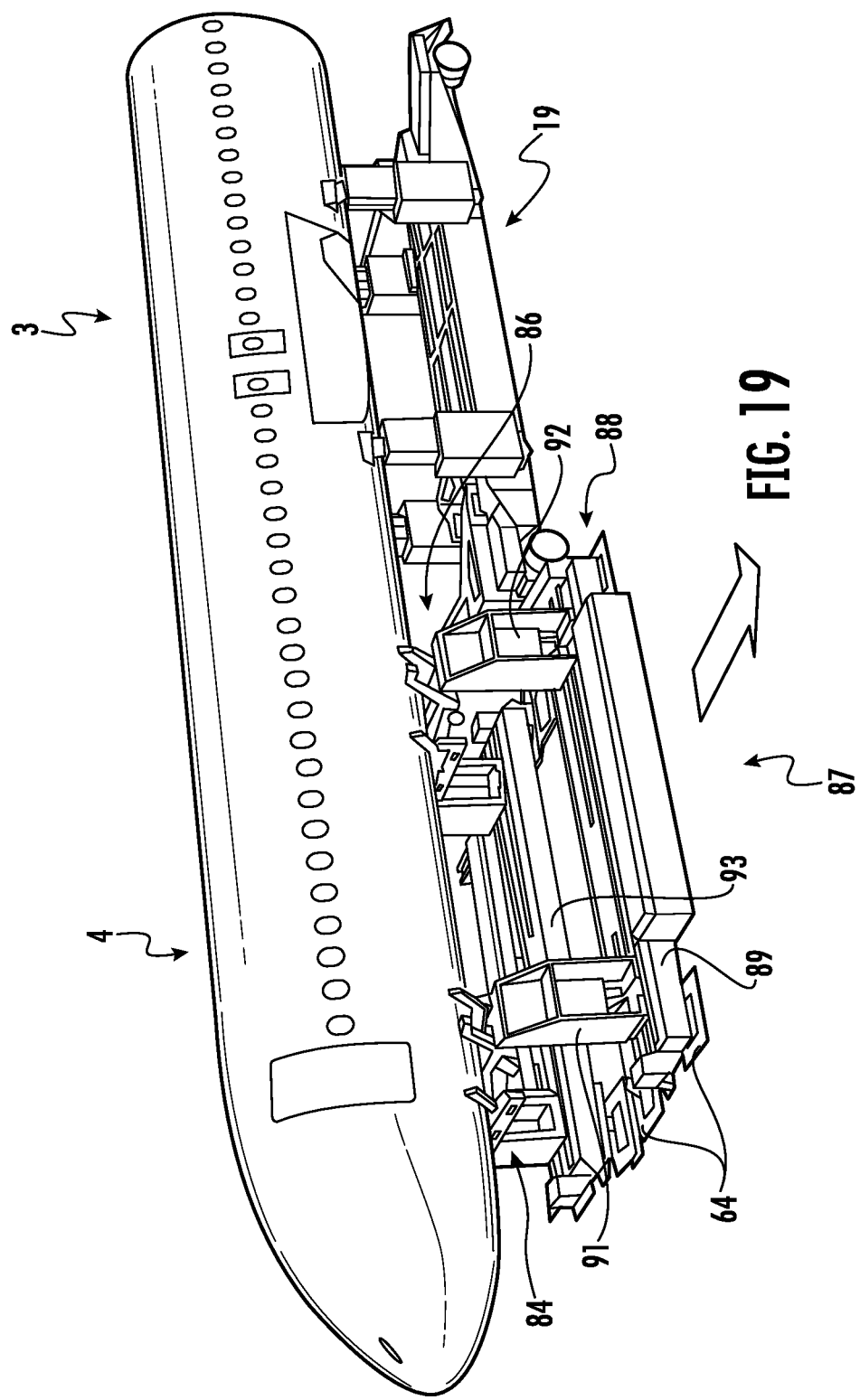
FIG. 19 is an overview showing a central section carried by a logistics trolley opposite a front section carried by a frame supported by movable plates according to a second variant of the disclosure herein.

The adjustable support, indicated using reference sign 87 in FIG. 19, comprises a frame 88 including a left-hand base 89 carrying a left-hand front pillar 91 and a left-hand rear pillar 92, and a right-hand base 93 carrying a right-hand front pillar and a right-hand rear pillar. These bases, which are rectangular on the floor, extend parallel to one another in the longitudinal direction and are spaced apart transversely from one another by a distance greater than the width of the rolling chassis 83 of the trolley 82.

As in the first variant, the frame formed by these bases is supported by movable plates 64 built into the floor, in this case four movable plates 64 carry the left-hand base 89 and four more movable plates 64 carry the right-hand base 93, the bases 89 and 93 being separate and distinct in this example.

Each of the two front pillars carried by the bases 89 and 93 has an attachment sliding along the pillar that is designed to receive a lateral end of the front cradle 84 and is provided with controlled mechanical structure enabling these attachments to be raised or lowered in order to raise or lower this front cradle 84. Similarly, the rear pillars are arranged to receive the lateral ends of the rear cradle 86 and have controlled structure enabling the cradles 86 being carried thereby to be lowered or raised.

When the front section 4 supported by the cradles 84 and 86 carried by the transport trolley 82 is moved, this trolley is first positioned between the bases 89 and 93, the attachments of which have previously been lowered. Once the trolley 82 is in the reference position thereof between the bases, the pillars are commanded to raise the attachments thereof, which then come to bear beneath the lateral ends of the two cradles, enabling an operator to mechanically couple each attachment to the lateral end of the cradle supported thereby.

Once the four attachments have been coupled to the ends of the cradles carried thereby, the pillars are commanded to raise these attachments by a given height in order to raise the whole of the front section by the cradles 84 and 86.

At this stage, the transfer of the front section and of the cradles thereof from the transport trolley to the adjustable support is complete. The transport trolley 82 can then be withdrawn, before commanding the four pillars to first position the edge of the rear end of the front section 4 at the same height as the edge of the front end of the central section 3. The two front pillars can then be commanded to adjust the inclination of the front section in relation to the floor. Complementarily, each pillar can be moved in relation to the floor independently such that the whole enables movements enabling adjustment of the front section according to the six degrees of freedom in order to ensure the geometric conformity thereof in relation to the central section. Once the correct position has been reached, the front orbital joint can be made in order to rigidly connect the front section to the central section.

Similarly, the rear section 6 of the fuselage is installed on an adjustable support of the same type as the support 87, which is then controlled to position this rear section 6 so as to position it in geometric conformity with the central section, in order to make the rear orbital joint rigidly connecting the central section to the rear section.

In this second variant, as in the first variant, once the two orbital joints have been made, the front adjustable support and the rear adjustable support are commanded to lower the related cradles thereof, before these supports are withdrawn laterally so that the assembly of the fuselage is resting only on the logistics trolley 19.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A facility for assembling a first aircraft fuselage section and a second aircraft fuselage section via edges of ends thereof, comprising:
    a floor;
    a logistics trolley arranged to carry the first aircraft fuselage section, that can be moved on the floor and immobilized in a predetermined position;
    a first transport trolley arranged to carry the first aircraft fuselage section, that can be moved on the floor, and that is arranged to transfer the first aircraft fuselage section to the logistics trolley;
    at least one adjustable support installed on the floor in another predetermined position to carry the second aircraft fuselage section;
    a second transport trolley arranged to carry the second aircraft fuselage section, that can be moved on the floor, and that is arranged to transfer the second aircraft fuselage section to the adjustable support;
    wherein each adjustable support can be commanded to adjust a position of the second aircraft fuselage section in relation to the first aircraft fuselage section, such as to position one edge of one end of the second aircraft fuselage section in geometric conformity with one edge of one end of the first aircraft fuselage section,
    wherein the adjustable support is configured for adjusting the position of the second aircraft fuselage section with six degrees of freedom; and
    wherein the first transport trolley and the second transport trolley each comprises a tubular chassis having a base and two branches extending from the base to define an overall "U" shape, the branches of which are configured to extend on either side of the first or second aircraft fuselage section.

2. The facility according to claim 1, wherein the second transport trolley is fitted with a front central cradle and a rear central cradle to support the second aircraft fuselage section, wherein the cradles can be removed from the transport trolley and transferred along with the second aircraft fuselage section to the adjustable support.

3. The facility according to claim 1, wherein the second transport trolley comprises a U-shaped chassis that can be positioned about the adjustable support while holding the second aircraft fuselage section above the adjustable support.

4. The facility according to claim 1, wherein at least one adjustable support can be moved on the floor when not carrying a second aircraft fuselage section.

5. The facility according to claim 1, wherein the adjustable support has a U-shaped frame enabling the second transport trolley to be positioned inside the frame while holding the second aircraft fuselage section above the frame.

6. The facility according to claim 1, wherein the adjustable support comprises a frame fitted with a front central cradle and a rear central cradle to hold the second aircraft fuselage section, and wherein each cradle can be raised and lowered to adjust the position of the second aircraft fuselage section, and wherein the frame rests on movable plates built into the floor that enable the frame to be repositioned locally on the floor to adjust the position of the second aircraft fuselage section.

7. The facility according to claim 6, wherein the adjustable support has a frame that can be moved on the floor when not carrying the second aircraft fuselage section.

8. The facility according to claim 1, wherein external dimensions of the logistics trolley are less than external dimensions of the first transport trolley such that the logistics trolley fits within an internal space delimited by the tubular chassis.

9. The facility according to claim 1, wherein external dimensions of the at least one adjustable support are less than external dimensions of the second transport trolley such that the at least one adjustable support fits within an internal space delimited by the tubular chassis.

10. The facility according to claim 1, wherein each of the branches of the tubular chassis of the first transport trolley comprises two lateral carrying attachments that extend upwards and are configured to support the first aircraft fuselage section.

11. A facility for assembling a first aircraft fuselage section and a second aircraft fuselage section via edges of ends thereof, comprising:

a floor;
a logistics trolley arranged to carry the first aircraft fuselage section, that can be moved on the floor and immobilized in a predetermined position;
a first transport trolley arranged to carry the first aircraft fuselage section, that can be moved on the floor, and that is arranged to transfer the first aircraft fuselage section to the logistics trolley;
at least one adjustable support installed on the floor in another predetermined position to carry the second aircraft fuselage section; and
a second transport trolley arranged to carry the second aircraft fuselage section, that can be moved on the floor, and that is arranged to transfer the second aircraft fuselage section to the adjustable support;
wherein each adjustable support can be commanded to adjust a position of the second aircraft fuselage section in relation to the first aircraft fuselage section, such as to position one edge of one end of the second aircraft fuselage section in geometric conformity with one edge of one end of the first aircraft fuselage section;
wherein the second transport trolley is fitted with a front central cradle and a rear central cradle to support the second aircraft fuselage section, wherein the cradles can be removed from the transport trolley and transferred along with the second aircraft fuselage section to the adjustable support; and
wherein the adjustable support comprises two hexapods, each of which is arranged to receive a cradle to carry the second aircraft fuselage section using the cradles.

* * * * *